(12) United States Patent
Sakata

(10) Patent No.: US 11,198,334 B2
(45) Date of Patent: Dec. 14, 2021

(54) PNEUMATIC TIRE

(71) Applicant: TOYO TIRE & RUBBER CO., LTD., Itami (JP)

(72) Inventor: Hirokazu Sakata, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 330 days.

(21) Appl. No.: 16/188,903

(22) Filed: Nov. 13, 2018

(65) Prior Publication Data

US 2019/0160889 A1   May 30, 2019

(30) Foreign Application Priority Data

Nov. 30, 2017 (JP) .............................. JP2017-230203

(51) Int. Cl.
*B60C 15/00* (2006.01)
*B60C 15/06* (2006.01)
(Continued)

(52) U.S. Cl.
CPC .......... *B60C 15/0036* (2013.01); *B60C 9/023* (2013.01); *B60C 9/08* (2013.01); *B60C 15/0009* (2013.01); *B60C 15/0054* (2013.01); *B60C 15/06* (2013.01); *B60C 19/001* (2013.01); *B60C 2009/045* (2013.01); *B60C 2015/009* (2013.01); *B60C 2015/061* (2013.01); *B60C 2015/0614* (2013.01)

(58) Field of Classification Search
CPC .......................... B60C 15/0027; B60C 15/0036
See application file for complete search history.

(56) References Cited

U.S. PATENT DOCUMENTS

2009/0188601 A1  7/2009  Kuniyasu
2010/0043936 A1  2/2010  Niedermier et al.

FOREIGN PATENT DOCUMENTS

CN      1078691 A    11/1993
CN    101654042 A     2/2010
(Continued)

OTHER PUBLICATIONS

Cn101927664 machine translation (Year: 2010).*
(Continued)

*Primary Examiner* — Timothy Kennedy
*Assistant Examiner* — Alexander A Wang
(74) *Attorney, Agent, or Firm* — Westerman, Hattori, Daniels & Adrian, LLP

(57) ABSTRACT

A pneumatic tire includes: paired bead portions respectively including annular bead cores and bead fillers disposed on an outer side in a tire radial direction of the bead cores; sidewall portions respectively extending outward in the tire radial direction from the bead portions; a tread portion connected to outer ends in the tire radial direction of the sidewall portions to form a tread; a carcass layer suspended between the bead portions; and a belt layer provided on an outer side in the tire radial direction of the carcass layer in the tread portion. The carcass layer has a first ply that continuously extends between the bead portions and that has opposite end portions and a second ply that extends from a position in contact with an inner peripheral face of an end portion, wherein the second ply has higher tensile strength than the tensile strength of the first ply.

6 Claims, 2 Drawing Sheets

(51) Int. Cl.
_B60C 9/08_ (2006.01)
_B60C 9/02_ (2006.01)
_B60C 19/00_ (2006.01)
_B60C 9/04_ (2006.01)

(56) References Cited

FOREIGN PATENT DOCUMENTS

| | | | |
|---|---|---|---|
| CN | 101927664 A | | 12/2010 |
| CN | 201922860 U | | 8/2011 |
| EP | 565944 A1 | | 10/1993 |
| JP | H11-011109 A | | 1/1999 |
| JP | 2001-088511 A | | 4/2001 |
| JP | 2007-302018 A | | 11/2007 |
| WO | WO 2014/126701 | * | 8/2014 |

OTHER PUBLICATIONS

"Reinforcing Materials in Rubber Products", Nokian Tyres (Year: 2015).*
Office Action dated Jul. 2, 2020, issued in counterpart CN Application No. 201811360616.4, with English translation. (14 pages).
Office Action dated Mar. 29, 2021, issued in counterpart CN Application No. 201811360616 4, with English Translation. (16 pages).
Office Action dated Jul. 16, 2021, issued in counterpart JP Application No. 2017-230203, with English Translation. (6 pages).

* cited by examiner

PNEUMATIC TIRE

BACKGROUND OF THE INVENTION

Field of the Invention

The present invention relates to a pneumatic tire and particularly to a pneumatic tire including a carcass layer formed by two or more carcass plies.

Description of the Related Art

A general pneumatic tire includes paired bead portions, sidewall portions respectively extending outward in a tire radial direction from the bead portions, a tread portion connected to outer ends in the tire radial direction of the sidewall portions to form a tread, and a carcass layer suspended between the paired bead portions.

In a case of a pneumatic tire used under severe conditions such as traveling on a rough road, a carcass layer may be formed by two carcass plies in some cases in order to secure cutting resistance and puncture resistance (see Patent Document 1 below, for example). However, the carcass layer formed by the two carcass plies increases a weight and deteriorates a rolling resistance.

PRIOR ART DOCUMENT

Patent Document

Patent Document 1: JP-A-2007-302018

SUMMARY OF THE INVENTION

The present invention has been made with the above-described circumstances in view and its object is to provide a pneumatic tire with which cutting resistance and puncture resistance of the tire can be secured while increase in weight and rolling resistance of the tire is suppressed.

A pneumatic tire according to the present invention is a pneumatic tire including:

paired bead portions respectively including annular bead cores and bead fillers disposed on an outer side in a tire radial direction of the bead cores;

sidewall portions respectively extending outward in the tire radial direction from the bead portions;

a tread portion connected to outer ends in the tire radial direction of the sidewall portions to form a tread;

a carcass layer suspended between the bead portions; and a belt layer provided on an outer side in the tire radial direction of the carcass layer in the tread portion, wherein the carcass layer has a first ply that continuously extends between the bead portions and that has opposite end portions respectively rolled up around the bead cores from inner sides in a tire width direction toward outer sides in the tire width direction and a second ply that extends from a position in contact with an inner peripheral face of an end portion disposed on an outside in mounting to a vehicle out of opposite end portions of the belt layer toward the bead core via an inner side in the tire width direction of the bead filler and that has an end portion rolled up around the bead core from the inner side in the tire width direction toward the outer side in the tire width direction and the second ply has higher tensile strength than the tensile strength of the first ply.

With this structure, it is possible to obtain cutting resistance and puncture resistance, because the first ply and the second ply are disposed at a shoulder portion positioned on the outside in the mounting to the vehicle, the shoulder portion liable to receive side cuts as a result of contact with edge stones and the like. Because the second ply is not disposed at a portion to which tension is not applied, and specifically, on an inner peripheral side of the belt layer, it is possible to suppress increase in weight and rolling resistance. Furthermore, by relatively increasing the tensile strength of the second ply close to a tire outer surface and relatively decreasing the tensile strength of the first ply far from the tire outer surface in the shoulder portion positioned on the outside in the mounting to the vehicle, it is possible to effectively suppress increase in weight and rolling resistance due to the first ply while securing sufficient cutting resistance and puncture resistance with the second ply.

In the present invention, the pneumatic tire may further include a third ply that extends from a position in contact with an inner peripheral face of an end portion disposed on an inside in the mounting to the vehicle out of the opposite end portions of the belt layer toward the bead core via an inner side in the tire width direction of the bead filler and that has an end portion rolled up around the bead core from the inner side in the tire width direction toward the outer side in the tire width direction.

By providing the third ply, a rigidity difference between left and right sides of the pneumatic tire decreases, which improves steering stability.

In the present invention, the third ply may have equal tensile strength to the tensile strength of the second ply.

With this structure, the rigidity difference between the left and right sides of the pneumatic tire further decreases, which further improves the steering stability.

In the present invention, the third ply may have tensile strength lower than or equal to the tensile strength of the first ply.

By relatively decreasing the tensile strength of the third ply disposed in the sidewall portion positioned on the inside in the mounting to the vehicle, it is possible to suppress increase in weight and rolling resistance due to the third ply.

DETAILED DESCRIPTION OF THE PREFERRED EMBODIMENTS

Embodiments of the present invention will be described below with reference to the drawings.

Figure 1:
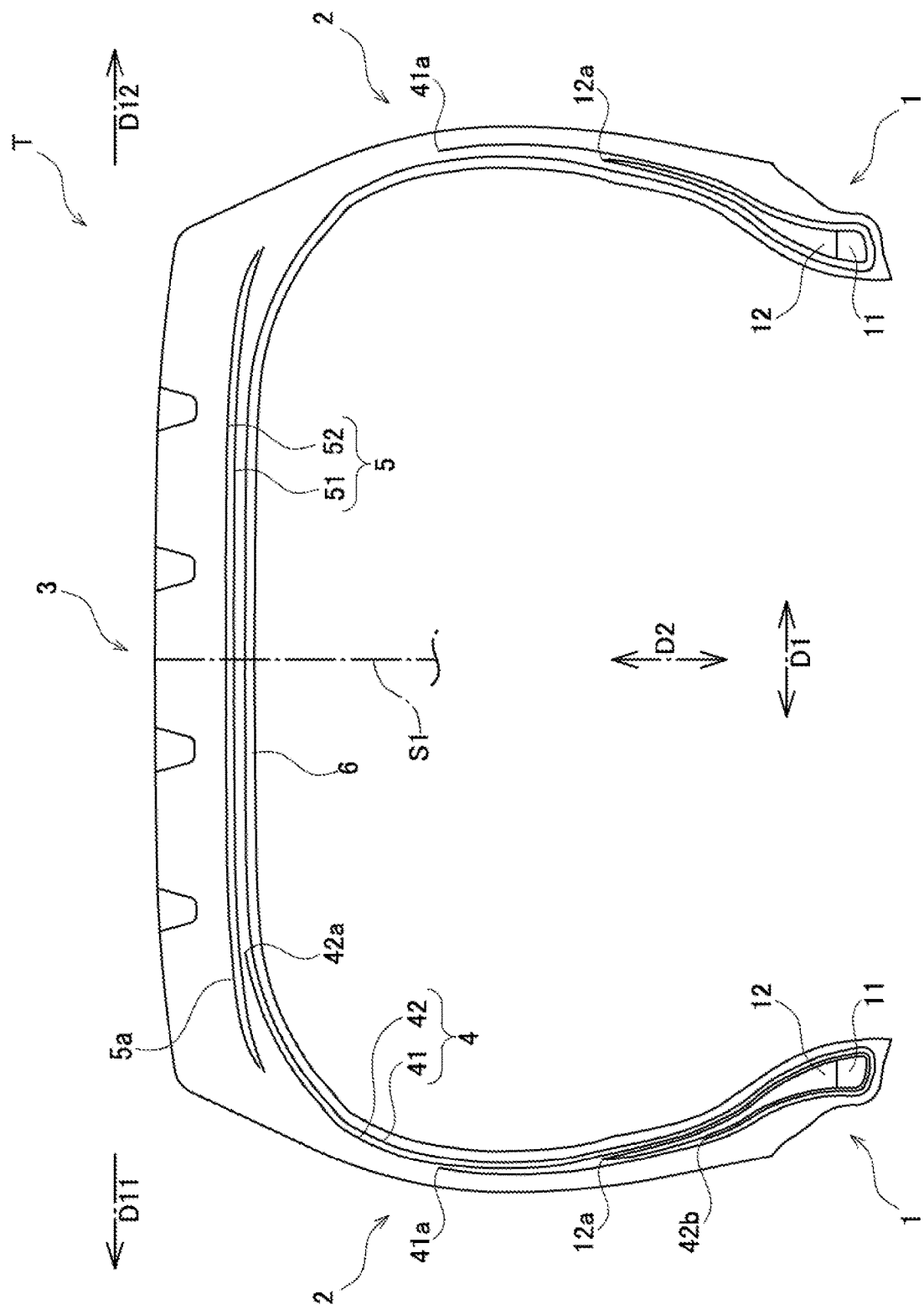
FIG. 1 is a sectional view along a tire meridian and schematically showing an example of a pneumatic tire according to the present invention.

A pneumatic tire T shown in FIG. 1 includes paired bead portions 1, sidewall portions 2 respectively extending outward in a tire radial direction D2 from the bead portions 1, a tread portion 3 connected to outer ends in the tire radial direction D2 of the sidewall portions 2 to form a tread, a carcass layer 4 suspended between the paired bead portions 1, and a belt layer 5 provided on an outer side in the tire radial direction D2 of the carcass layer 4 in the tread portion 3.

In FIG. 1, a tire width direction D1 is a left-right direction. A tire radial direction D2 is a diameter direction of the tire 1 and a tire circumferential direction is a direction around a tire rotation axis. A tire equatorial plane S1 is a plane orthogonal to the tire rotation axis and positioned at a center in the tire width direction D1 and a tire meridional plane is a plane including the tire rotation axis and orthogonal to the tire equatorial plane S1.

Each of the paired bead portions 1 includes a bead core 11 which is a bundle of steel wires having an annular shape in the tire circumferential direction and a bead filler 12 disposed on an outer side in the tire radial direction D2 of the bead core 11.

The belt layer 5 includes at least two layers of belt plies 51, 52. In the present embodiment, the belt layer 5 includes the two layers of belt plies 51, 52. Each of the belt plies 51, 52 includes a plurality of belt cords arranged parallel with each other and a topping rubber covering the belt cords.

The respective belt plies 51, 52 are layered so that the groups of belt cords in the respective plies are inclined at predetermined inclination angles (e.g., 15 to 35) to the tire circumferential direction in opposite orientations to each other and cross each other. For the belt cords, organic fibers such as polyester, rayon, nylon, and aramid or metal such as steel are/is used suitably. A belt reinforcing layer formed by cords extending substantially in the tire circumferential direction and covered with rubber may be provided on an outer periphery of the belt layer 5.

The pneumatic tire T according to the embodiment has an asymmetric structure with respect to the tire equatorial plane S1. The pneumatic tire T is a tire which is to be mounted to a vehicle in a prescribed direction and which of left and right sides of the pneumatic tire T should face the vehicle when the pneumatic tire T is mounted to a rim is prescribed. A tread pattern formed on a tire outer surface at the tread portion 3 may have a symmetric structure or an asymmetric structure with respect to the tire equatorial plane S1.

The sidewall portions 2 have signs indicating directions in which the tire is to be mounted to the vehicle. To put it concretely, the sidewall portions 2 have, on their outer surfaces, display portions showing the directions in which the tire is to be mounted to the vehicle. In the embodiment, one of the sidewall portions 2 disposed on an outside (left side in FIG. 1) when the tire is mounted to the vehicle has a sign showing that this side is to be on the outside of the vehicle (e.g., "OUTSIDE") and the other sidewall portion 2 disposed on an inside (right side in FIG. 1) has a sign showing that this side is to be on the inside of the vehicle (e.g., "INSIDE"). In the tire width direction D1, an outward direction in the mounting to the vehicle is referred to as "vehicle outward direction D11" and an inward direction in the mounting to the vehicle is referred to as "vehicle inward direction D12".

The carcass layer 4 includes a first carcass ply 41 (corresponding to a first ply) and a second carcass ply 42 (corresponding to a second ply). On an inner side of the carcass layer 4, an inner liner rubber 6 that is excellent in preventing permeation of gas is disposed in order to maintain air pressure.

The first carcass ply 41 continuously extends between the bead portions 1 and has opposite end portions 41a, 41a respectively rolled up around the bead cores 11 from an inner side in the tire width direction D1 toward an outer side in the tire width direction D1.

The second carcass ply 42 is adjacent to an outer side of the bead core 11 and the first carcass ply 41 is adjacent to an outer side of the second carcass ply 42. In other words, the second carcass ply 42 and the first carcass ply 41 are arranged in this order outward from a periphery of the bead core 11.

The second carcass ply 42 has a starting end portion 42a in contact with an inner peripheral face of an end portion 5a disposed on the outside in the mounting to the vehicle out of opposite end portions in the tire width direction D1 of the belt layer 5. The second carcass ply 42 extends from the starting end portion 42a toward the bead core 11 via an inner side in the tire width direction D1 of the bead filler 12 disposed on the outside in the mounting to the vehicle. The second carcass ply 42 has an end portion 42b rolled up around the bead core 11 from the inner side in the tire width direction D1 toward the outer side in the tire width direction D1. The end portion 42b of the second carcass ply 42 is positioned on the outer side in the tire width direction D1 of the bead filler 12. At the bead portion 1, the second carcass ply 42 is disposed between the bead core 11 and the first carcass ply 41. Because the starting end portion 42a is in contact with the inner peripheral face of the end portion 5a of the belt layer 5 and the end portion 42b is locked to the bead core 11, proper tension is applied to the second carcass ply 42 of the sidewall portion 2 in vulcanization.

The opposite end portions 41a, 41a of the first carcass ply 41 are positioned on an outer side in the tire radial direction D2 of outer ends 12a in the tire radial direction D2 of the bead fillers 12. The end portion 41a of the first carcass ply 41 is disposed to be adjacent to the second carcass ply 42 in the sidewall portion 2. In the embodiment, the end portion 42b of the second carcass ply 42 is positioned on an inner side in the tire radial direction D2 of the opposite end portions 41a of the first carcass ply 41. However, the end portion 42b of the second carcass ply 42 may be at the same position in the tire radial direction D2 as the opposite end portions 41a of the first carcass ply 41.

Each of the first carcass ply 41 and the second carcass ply 42 includes a plurality of ply cords arranged in a direction substantially orthogonal to the tire circumferential direction and a topping rubber covering the ply cords. For the ply cords, organic fibers such as polyester, rayon, nylon, and aramid are used.

The second carcass ply 42 has higher tensile strength than the tensile strength of the first carcass ply 41. Here, the tensile strength of the second carcass ply 42 refers to a load under which the ply cords rupture during a tensile test. The tensile strength of the first carcass ply 41 refers to the same. The tensile strength can be adjusted by adjusting cord diameters of the ply cords, a density at which the ply cords are arranged per unit width, and the like, for example. In other words, in order to increase the tensile strength, the cord diameters of the ply cords may be increased or the density at which the ply cords are arranged per unit width may be increased. In general, if the tensile strength is high, a weight of the carcass ply per unit width is heavy.

The pneumatic tire T in the embodiment can obtain cutting resistance and puncture resistance, because the first carcass ply 41 and the second carcass ply 42 are layered and disposed in the shoulder portion positioned on the outside in the mounting to the vehicle, the outside shoulder portion liable to receive side cuts as a result of contact with edge stones. Because the second carcass ply 42 is not disposed at a portion to which the tension is not applied, and specifically, on an inner peripheral side of the belt layer 5, it is possible to suppress increase in weight and rolling resistance.

Furthermore, by relatively increasing the tensile strength of the second carcass ply 42 close to the tire outer surface and relatively decreasing the tensile strength of the first carcass ply 41 far from the tire outer surface, it is possible to effectively suppress increase in weight and rolling resistance due to the first carcass ply 41 while securing sufficient cutting resistance and puncture resistance with the second carcass ply 42.

Although the embodiment of the invention has been described above based on the drawings, specific structures should not be considered restricted to those in the embodiment. The scope of the invention is defined not only by the above description of the embodiment but also by the claims and includes meanings equivalent to the claims and all modifications in the scope of the claims.

It is possible to employ structures, employed in the above embodiment, in other arbitrary embodiments. Specific structures of the respective portions are not limited to those in the above embodiment but can be changed in various ways without departing from the gist of the invention.

Figure 2:
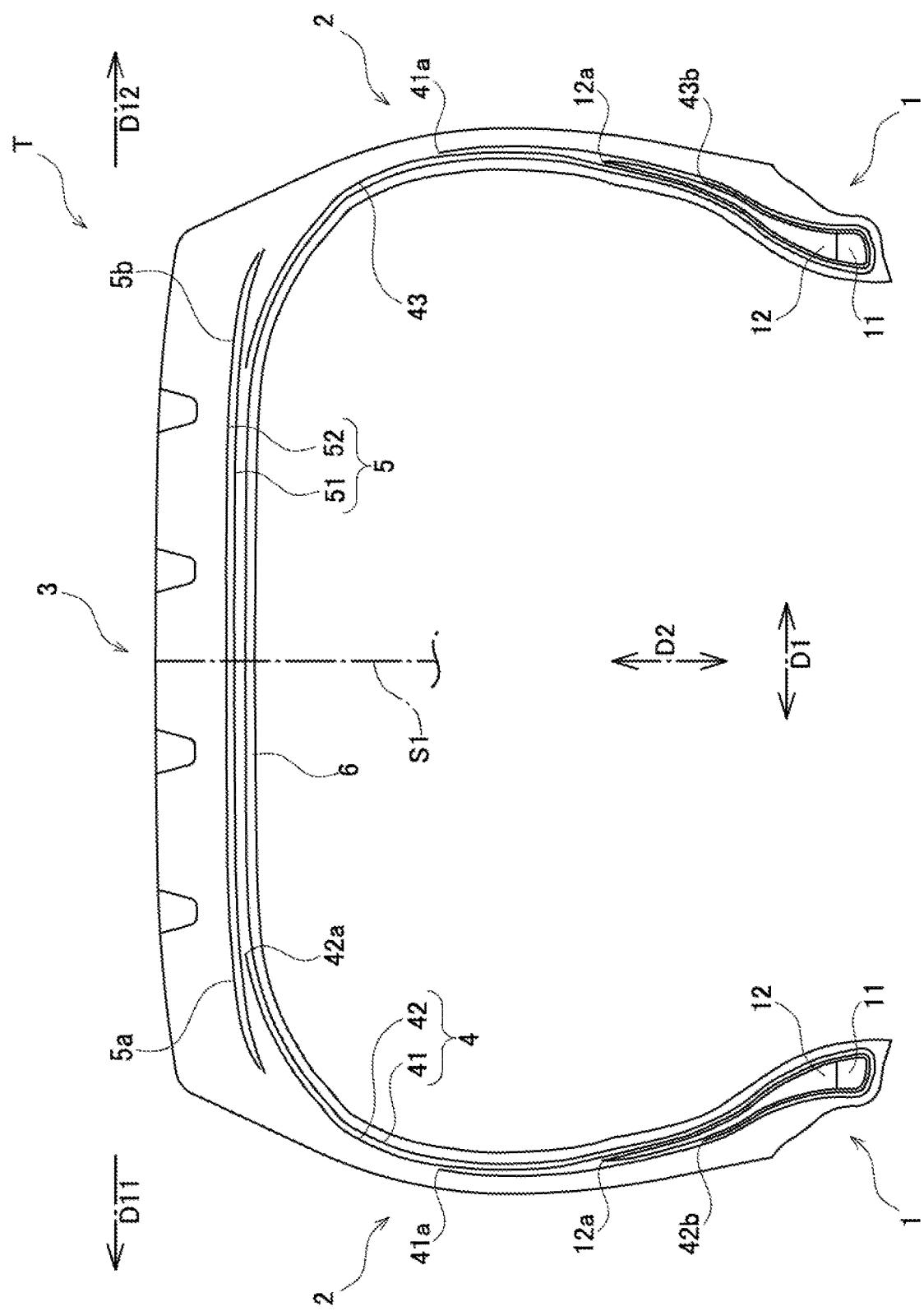
FIG. 2 is a sectional view along a tire meridian and schematically showing a pneumatic tire according to another embodiment.

OTHER EMBODIMENTS (1) As shown in FIG. 2, a pneumatic tire T may further include a third carcass ply 43 (corresponding to a third ply) that extends from a position in contact with an inner peripheral face of an end portion 5b disposed on an inside in mounting to a vehicle out of opposite end portions of a belt layer 5 toward a bead core 11 via an inner side in a tire width direction D1 of a bead filler 12. The third carcass ply 43 may have an end portion 43b rolled up around the bead core 11 from the inner side in the tire width direction D1 toward an outer side in the tire width direction D1. By providing the third carcass ply 43, a rigidity difference between left and right sides of the pneumatic tire T decreases, which improves steering stability.

(2) When the third carcass ply 43 is provided, the third carcass ply 43 preferably has equal tensile strength to that of the second carcass ply 42. In this way, a rigidity difference between the left and right sides of the pneumatic tire T further decreases, which further improves the steering stability.

(3) When the third carcass ply 43 is provided, the third carcass ply 43 may have tensile strength lower than or equal to that of the first carcass ply 41. By relatively decreasing the tensile strength of the third carcass ply 43 disposed in a sidewall portion 2 on the inside in the mounting to the vehicle, it is possible to suppress increase in weight and rolling resistance due to the third carcass ply 43.

EXAMPLES

Examples specifically showing the structures and the effects of the present invention will be described below. Properties to be evaluated of the examples and the like were measured as follows.

(1) External Damage Resistance

To evaluate resistance against a side burst that occurs when a tire runs over a protrusion such as an edge stone, each test tire was mounted to a real car, the real car drove into a road with the side stones and ran over the protrusion, and presence or absence of a failure of a tire side portion was checked. The vehicle speed was increased from 10 Km/h and an evaluation was made by a speed at which the failure occurred. The index evaluation was made with respect to an index 100 indicating a result of Comparative Example 1. The higher the value, the higher the speed at which the failure was found, i.e., the more excellent in external damage resistance.

(2) Rolling Resistance

Each tire of a size of 225/65R17 102H was mounted to a rim and then inflated to an air pressure of 210 kPa and a rolling resistance was measured pursuant to International Standard ISO28580 (JISD4234). The index evaluation was made with respect to an index 100 indicating a result of Comparative Example 1. The higher the index, the smaller the rolling resistance was.

(3) Steering Stability

Each tire of a size of 225/65R17 102H was mounted to a rim and then inflated to an air pressure of 210 kPa and mounted to a real car and a sensory evaluation was made by evaluation panelists (drivers). The index evaluation was made with respect to an index 100 indicating a result of Comparative Example 1. The higher the index, the more excellent the tire was in steering stability.

Examples 1 to 3

Examples 1 to 3 were tires according to the embodiment shown in FIG. 2. When tensile strength of a second carcass ply 42 was defined as A, tensile strength of a first carcass ply 41 was defined as B, and tensile strength of a third carcass ply 43 was defined as C, Example 1 satisfied A=C>B, Example 2 satisfied A>B=C, and Example 3 satisfied A>B>C. A value of B in each of Examples 1 to 3 was equal to that in Comparative Example 1 (described later). The evaluations were made by using the tires and results of the evaluations are shown in Table 1.

Example 4

Example 4 was a tire according to the embodiment shown in FIG. 1. Example 4 satisfied A>B. A value of B in Example 4 was equal to that in Comparative Example 1 (described later). The evaluations were made by using the tires and results of the evaluations are shown in Table 1.

Comparative Example 1

Comparative Example 1 was a tire formed by changing the tire according to Example 1 so as to satisfy A=B=C. The evaluations were made by using the tires and results of the evaluations are shown in Table 1.

TABLE 1

| | Example 1 | Example 2 | Example 3 | Example 4 | Comparative example 1 |
|---|---|---|---|---|---|
| Shape | FIG. 2 | FIG. 2 | FIG. 2 | FIG. 1 | FIG. 2 |
| Tensile strength | A = C > B | A > B = C | A > B > C | A > B | A = B = C |
| External damage resistance | 110 | 110 | 110 | 110 | 100 |
| Rolling resistance | 95 | 98 | 102 | 104 | 100 |
| Steering stability | 105 | 102 | 98 | 96 | 100 |

As shown in Table 1, in a case of each of the tires in Examples 1 to 4, as compared with the tire in Comparative Example 1, it was possible to improve the external damage resistance while suppressing increase in the rolling resistance. By adjusting the tensile strength C of the third carcass ply 43 as in each of Examples 1 to 3, it was possible to suppress the increase in the rolling resistance. By making the tensile strength C of the third carcass ply 43 equal to the tensile strength A of the second carcass ply 42 as in Example 1, the steering stability was especially improved.

What is claimed is:

1. A pneumatic tire comprising:
paired bead portions respectively including annular bead cores and bead fillers disposed on an outer side in a tire radial direction of the bead cores;
sidewall portions respectively extending outward in the tire radial direction from the bead portions;
a tread portion connected to outer ends in the tire radial direction of the sidewall portions to form a tread;
a carcass layer suspended between the bead portions; and
a belt layer provided on an outer side in the tire radial direction of the carcass layer in the tread portion,
wherein
the carcass layer has a first ply that continuously extends between the bead portions and that has opposite end portions respectively rolled up around the bead cores from inner sides in a tire width direction toward outer sides in the tire width direction and a second ply that extends from a position in contact with an inner peripheral face of an end portion disposed on an outside in mounting to a vehicle out of opposite end portions of the belt layer toward the bead core via an inner side in the tire width direction of the bead filler and that has an end portion rolled up around the bead core from the inner side in the tire width direction toward the outer side in the tire width direction,
the carcass layer having only the first ply in one of the sidewall portions on an inside in the mounting to the vehicle and having the first ply and the second ply in the other of the sidewall portions on the outside in the mounting to the vehicle, and
the second ply has higher tensile strength than the tensile strength of the first ply.

2. The pneumatic tire according to claim 1, wherein the end portion of the second ply is positioned on an outer side in the tire width direction of the bead filler.

3. The pneumatic tire according to claim 1, wherein
the opposite end portions of the first ply are positioned on the outer side in the tire radial direction of outer ends in the tire radial direction of the bead fillers, and
the end portion of the second ply is positioned on the inner side in the tire radial direction of the outer ends in the tire radial direction of the bead fillers.

4. A pneumatic tire comprising:
paired bead portions respectively including annular bead cores and bead fillers disposed on an outer side in a tire radial direction of the bead cores;
sidewall portions respectively extending outward in the tire radial direction from the bead portions;
a tread portion connected to outer ends in the tire radial direction of the sidewall portions to form a tread;
a carcass layer suspended between the bead portions, the carcass layer having a first ply, a second ply, and a third ply; and
a belt layer provided on an outer side in the tire radial direction of the carcass layer in the tread portion,
wherein
the first ply continuously extends between the bead portions and that has opposite end portions respectively rolled up around the bead cores from inner sides in a tire width direction toward outer sides in the tire width direction,
the second ply extends from a position in contact with an inner peripheral face of an end portion disposed on an outside in mounting to a vehicle out of opposite end portions of the belt layer toward the bead core via an inner side in the tire width direction of the bead filler and has an end portion rolled up around the bead core from the inner side in the tire width direction toward the outer side in the tire width direction,
the third ply extends from a position in contact with an inner peripheral face of an end portion disposed on an inside in the mounting to the vehicle out of the opposite end portions of the belt layer toward the bead core via an inner side in the tire width direction of the bead filler and has an end portion rolled up around the bead core from the inner side in the tire width direction toward the outer side in the tire width direction,
the opposite end portions of the first ply are positioned on the outer side in the tire radial direction of outer ends in the tire radial direction of the bead fillers,
the end portion of the second ply and the end portion of the third ply are each positioned on the inner side in the tire radial direction of the outer ends in the tire radial direction of the bead fillers, and
the second ply has higher tensile strength than the tensile strength of the first ply.

5. The pneumatic tire according to claim 4, wherein the third ply has equal tensile strength to the tensile strength of the second ply.

6. The pneumatic tire according to claim 4, wherein the third ply has tensile strength lower than or equal to the tensile strength of the first ply.

\* \* \* \* \*